United States Patent
Goeson et al.

(10) Patent No.: US 9,919,714 B2
(45) Date of Patent: Mar. 20, 2018

(54) CONTROL SYSTEMS AND METHODS FOR LOSS OF COMMUNICATION

(71) Applicant: GM Global Technology Operations LLC, Detroit, MI (US)

(72) Inventors: Tanner E. Goeson, Bowmanville (CA); Denesen Thuraisingam, Toronto (CA); Bob C. Nguyen, Aurora (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 169 days.

(21) Appl. No.: 15/132,603

(22) Filed: Apr. 19, 2016

(65) Prior Publication Data

US 2017/0297585 A1   Oct. 19, 2017

(51) Int. Cl.
*B60W 50/00*   (2006.01)
*B60W 50/035*   (2012.01)
*G07C 5/08*   (2006.01)

(52) U.S. Cl.
CPC ......... *B60W 50/035* (2013.01); *G07C 5/0808* (2013.01); *G07C 5/0825* (2013.01); *B60W 2510/0676* (2013.01); *B60W 2510/242* (2013.01); *B60W 2710/30* (2013.01)

(58) Field of Classification Search
None
See application file for complete search history.

(56) References Cited

U.S. PATENT DOCUMENTS

| | | | |
|---|---|---|---|
| 2014/0121907 A1* | 5/2014 | Whinnery | G06F 17/00 701/49 |
| 2016/0094060 A1* | 3/2016 | Alfermann | H01M 10/44 320/162 |
| 2017/0028837 A1* | 2/2017 | Welschoff | B60K 6/52 |

* cited by examiner

*Primary Examiner* — James M McPherson (57) ABSTRACT

A control system of a vehicle includes a network, a first control module, and a second control module. The first control module measures a voltage of a battery of the vehicle and supplies power from the battery to an actuator of the vehicle based on commands received via the network. The second control module is external to the first control module, transmits the commands to the first control module via the network, and, in response to diagnosing a loss of communication with the first control module, controls an alternator of the vehicle to increase the voltage of the battery. In response to diagnosing a loss of communication with the second control module, the first control module supplies power to the actuator based on predetermined data stored in the first control module.

20 Claims, 6 Drawing Sheets

CONTROL SYSTEMS AND METHODS FOR LOSS OF COMMUNICATION

FIELD

The present disclosure relates to vehicle control systems and more particularly to systems and methods for operation of a device despite a loss of communication.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion of an air/fuel mixture within an internal combustion engine of a vehicle generates heat. Cooling the engine is a cyclical process. Cool engine coolant absorbs heat from the engine, and the (warmed) engine coolant is circulated to a radiator. The radiator facilitates heat transfer from the engine coolant to air passing the radiator. The (cooled) engine coolant is circulated from the radiator back to the engine to absorb more heat from and cool the engine.

A cooling fan may also be implemented to provide airflow past the radiator at times when little air may otherwise pass the radiator. For example only, the cooling fan may be activated to provide airflow past the radiator when a vehicle speed is low or when an aerodynamic shutter is open and airflow past the radiator is low.

SUMMARY

In a feature, a control system of a vehicle is described. A first control module measures a voltage of a battery of the vehicle and supplies power from the battery to an actuator of the vehicle based on commands received via a network. A second control module is external to the first control module, transmits the commands to the first control module via the network, and, in response to diagnosing a loss of communication with the first control module, controls an alternator of the vehicle to increase the voltage of the battery. In response to diagnosing a loss of communication with the second control module, the first control module supplies power to the actuator based on predetermined data stored in the first control module.

In further features, the first control module diagnoses the loss of communication with the second control module in response to a lack of receipt of any commands from the second control module via the network for longer than a predetermined period.

In further features, the second control module diagnoses the loss of communication with the first control module in response to a lack of receipt of any communication from the second control module via the network for longer than a predetermined period.

In further features, the first control module further controls operation of the first control module in one of a low power sleep mode and an awake mode in response to the diagnosis of the loss of communication with the second control module.

In further features, in response to both (i) the diagnosis of the loss of communication with the second control module and (ii) the voltage of the battery being greater than a predetermined voltage, the first control module supplies power to the actuator based on a target value previously communicated to the first control module by the second control module via the network.

In further features, in response to the diagnosis of the loss of communication with the first control module, the second control module controls the alternator of the vehicle to increase the voltage of the battery to greater than the predetermined voltage.

In further features, the first control module supplies power to the actuator based on the target value until the voltage of the battery is less than a second predetermined voltage. The second predetermined voltage is less than the predetermined voltage.

In further features, the first control module disconnects the actuator from the battery when the voltage of the battery is less than a second predetermined voltage.

In further features, the first control module transitions to operation in a low power sleep mode when the voltage of the battery is less than a second predetermined voltage.

In further features, the first control module operates in an awake mode until the voltage of the battery is less than a third predetermined voltage and transitions to operation in a low power sleep mode when the voltage of the battery is less than the third predetermined voltage. The third predetermined voltage is less than the second predetermined voltage.

In a feature, a control method for a vehicle is described. The control method includes: by a first control module, measuring a voltage of a battery of the vehicle; by the first control module, supplying power from the battery to an actuator of the vehicle based on commands received via a network; by a second control module that is external to the first control module, transmitting the commands to the first control module via the network; by the second control module, in response to diagnosing a loss of communication with the first control module, controlling an alternator of the vehicle to increase the voltage of the battery; and by the first control module, in response to diagnosing a loss of communication with the second control module, supplying power to the actuator based on predetermined data stored in the first control module.

In further features, the control method further includes, by the first control module, diagnosing the loss of communication with the second control module in response to a lack of receipt of any commands from the second control module via the network for longer than a predetermined period.

In further features, the control method further includes, by the second control module, diagnosing the loss of communication with the first control module in response to a lack of receipt of any communication from the second control module via the network for longer than a predetermined period.

In further features, the control method further includes, by the first control module, operating in one of a low power sleep mode and an awake mode in response to the diagnosis of the loss of communication with the second control module.

In further features, the control method further includes, by the first control module, in response to both (i) the diagnosis of the loss of communication with the second control module and (ii) the voltage of the battery being greater than a predetermined voltage, supplying power to the actuator based on a target value previously communicated to the first control module by the second control module via the network.

In further features, the control method further includes, by the second control module, in response to the diagnosis of the loss of communication with the first control module, controlling the alternator of the vehicle to increase the voltage of the battery to greater than the predetermined voltage.

In further features, the control method further includes, by the first control module, supplying power to the actuator based on the target value until the voltage of the battery is less than a second predetermined voltage. The second predetermined voltage is less than the predetermined voltage.

In further features, the control method further includes, by the first control module, disconnecting the actuator from the battery when the voltage of the battery is less than a second predetermined voltage.

In further features, the control method further includes, by the first control module, transitioning to operation in a low power sleep mode when the voltage of the battery is less than a second predetermined voltage.

In further features, the control method further includes, by the first control module: operating in an awake mode until the voltage of the battery is less than a third predetermined voltage; and operating in a low power sleep mode when the voltage of the battery is less than the third predetermined voltage. The third predetermined voltage is less than the second predetermined voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel to generate torque. An engine control module (ECM) controls engine actuators based on a target torque. An alternator is driven by a crankshaft of the engine. The alternator converts mechanical energy into electrical energy, for example, to charge the battery.

Various electrical loads of the engine are powered by the battery. One example is an electric coolant pump that operates based on power from the battery. A pump control module controls application of power from the battery to a motor of the electric coolant pump based on a target speed received from the ECM via a network bus of the vehicle.

When the pump control module loses communication with the ECM, the pump control module could disable the coolant pump. The lack of coolant flow, however, may cause excessive temperatures if the engine remains running.

According to the present application, the ECM controls the alternator to change the voltage of the battery to a predetermined voltage when communication via the network with the pump control module is lost. When communication is lost, the pump control module may control the application of power based on a target speed previously communicated by the ECM when the voltage of the battery is greater than the predetermined voltage.

The voltage of the battery falling below the predetermined voltage may indicate to the pump control module that the engine has been shut down. When the voltage of the battery is less than the predetermined voltage, the pump control module may disable the coolant pump and either stay awake (e.g., to possibly receive a command) or operate in a sleep mode (e.g., to reduce power consumption) depending on the voltage of the battery. While the example of the ECM and the pump control module is discussed in detail, the present application is applicable to other modules and actuators of the vehicle.

Figure 1:
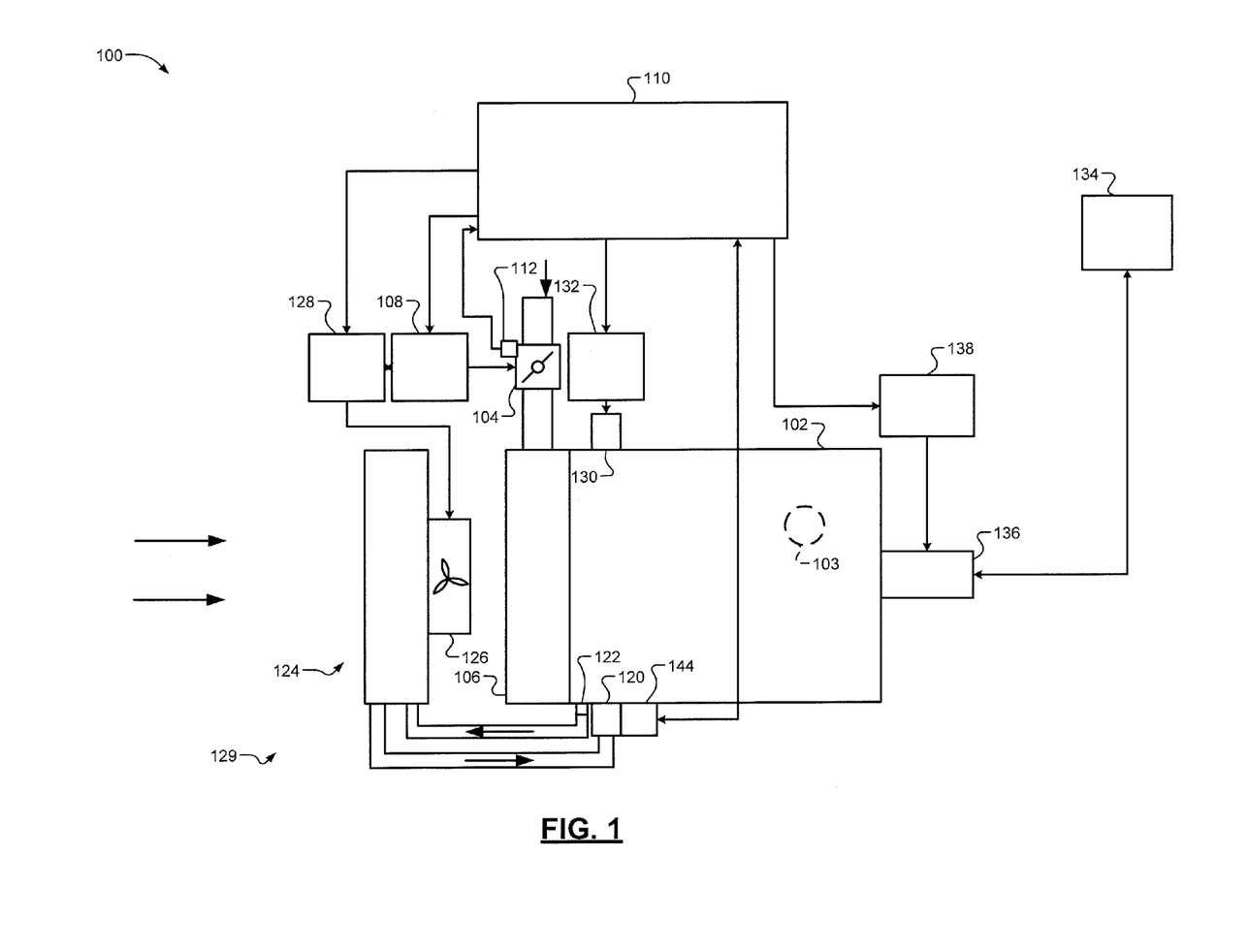
FIG. 1 is a functional block diagram of an example vehicle system.

Referring now to FIG. 1, a functional block diagram of an example vehicle system 100 is presented. An engine 102 combusts an air/fuel mixture within one or more cylinders to produce torque for a vehicle. While only cylinder 103 is shown, the engine 102 may include more than one cylinder. Air is drawn into the engine 102 through a throttle valve 104 and an intake manifold 106.

A throttle actuator module 108 controls opening of the throttle valve 104 based on signals from an engine control module (ECM) 110. A throttle position (TP) sensor 112 measures a TP (e.g., opening percentage) and generates a TP signal based on the position. Torque produced by the engine 102 may be output via a crankshaft (not shown). The ECM 110 may also control other engine actuators, such as fuel injection, spark timing, Combustion of the air/fuel mixture generates heat. Coolant may be used to selectively draw heat away from and cool the engine 102. A coolant pump 120 circulates the coolant. The coolant pump 120 is an electric coolant pump that includes an electric motor. When a thermostat 122 is in a closed state, the coolant pump 120 circulates the coolant through coolant channels (not shown) within the engine 102. When the thermostat 122 is in an open state, coolant within the engine 102 is circulated to a radiator 124, and coolant within the radiator 124 is circulated to the engine 102. The thermostat 122 may open when a temperature of the coolant is greater than a predetermined opening temperature.

The radiator 124 facilitates heat transfer from the coolant to air passing the radiator 124. In this manner, the radiator 124 facilitates cooling of the coolant. Cooler coolant can then be circulated back to the engine 102 to cool the engine 102. One or more fans, such as fan 126, may push or draw air across the radiator 124 to increase the airflow passing the radiator 124. For example only, the fan 126 may be activated (i.e., turned ON) to increase the airflow through the radiator 124 when little air would flow through the radiator 124, such as when the vehicle is stopped or moving slowly.

A fan actuator module 128 may control the fan 126 (e.g., ON or OFF) based on signals from the ECM 110. For example only, the ECM 110 may activate the fan 126 when the coolant temperature is greater than a predetermined fan on temperature. In various implementations, the fan 126 may include a variable speed fan, and the fan actuator module 128 may control the speed of the fan 126.

The fan 126 may also be used to increase airflow within an engine compartment 129 in which the engine 102 is located. Increasing the airflow within the engine compartment 129 may cool components other than the engine 102, the engine coolant, and the radiator 124 that are located within the engine compartment 129. For example only, other components that may be implemented within the engine compartment 129 that may be cooled by the fan 126 may include an air conditioning (AC) unit 130, a battery 134, an alternator 136, and other components implemented within the engine compartment 129. While the fan actuator module 128 is shown and described as being controlled by the ECM 110, the fan actuator module 128 may control the fan 126 based on signals from another control module (not shown), such as a chassis control module, a body control module, a hybrid control module, or another suitable module.

An AC control module 132 may control the AC unit 130 based on signals from the ECM 110. A compressor (not shown) of the AC unit 130 selectively compresses a refrigerant, and the compressor may be driven by the crankshaft of the engine 102. The AC unit 130 may provide cooling for a passenger cabin of the vehicle. An AC pressure sensor 137 measures pressure of the refrigerant and generates an AC pressure signal based on the pressure. While the AC control module 132 is shown and described as being controlled by the ECM 110, the AC control module 132 may control the AC unit 130 based on signals from another control module (not shown), such as the chassis control module, the body control module, the hybrid control module, or another suitable module.

The alternator 136 may provide one or more functions for the vehicle. For example only, the alternator 136 may apply a braking torque to the engine 102 under some circumstances, such as to convert mechanical power of the engine 102 into electrical power. Electrical power generated by the alternator 136 may be stored in the battery 134 and/or may be supplied to one or more vehicle systems for use. An alternator control module 138 controls the alternator 136 based on signals from the ECM 110. For example, the ECM 110 may set a target voltage of the battery 134 and control the alternator 136 to achieve the target voltage.

The coolant pump 120 may be a variable speed, electric coolant pump. A pump control module 144 controls a speed of the coolant pump 120 based on signals from the ECM 110. For example, the ECM 110 may command a target speed of the coolant pump 120 and the pump control module 144 may control application of power from the battery 134 to a motor of the coolant pump 120 based on the target speed. The ECM 110 is external to the pump control module 144.

Figure 2:
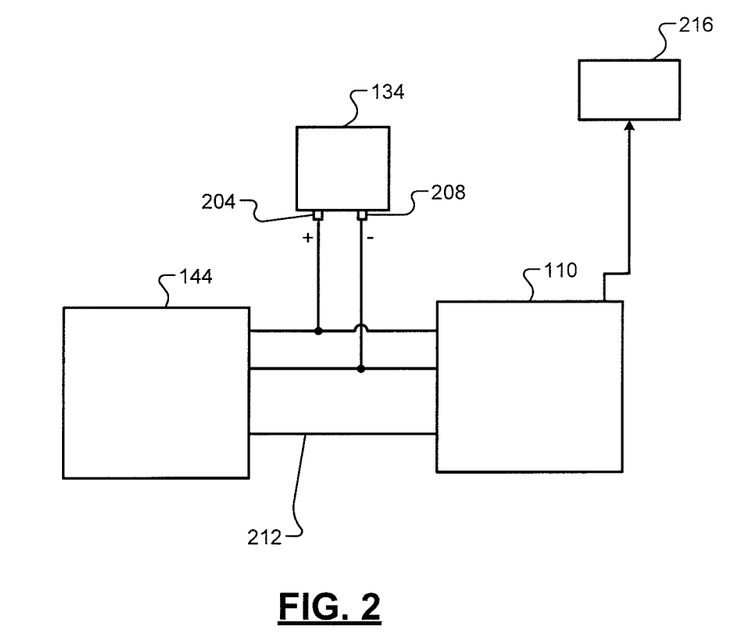
FIG. 2 is a functional block diagram of an example system including two control modules, a network, and a battery.

FIG. 2 is a functional block diagram of an example system including the ECM 110, the pump control module 144, and the battery 134. The battery 134 includes positive and negative terminals 204 and 208. Both the pump control module 144 and the ECM 110 are connected to the positive and negative terminals 204 and 208 of the battery. The pump control module 144 applies power to the coolant pump 120 based on power from the battery 134.

The pump control module 144 and the ECM 110 communicate via a local interconnect network (LIN) bus 212. For example, the ECM 110 communicates commands for operation of the pump control module 144 and the coolant pump 120 via the LIN 212. The pump control module 144 may communicate acknowledgements of receipt of the commands to the ECM 110 via the LIN 212. The ECM 110 and the pump control module 144 may each normally transmit signals via the LIN 212 every predetermined period.

The ECM 110 may diagnose the presence of one or more faults in the vehicle. For example, the ECM 110 and the pump control module 144 may each normally transmit signals via the LIN 212 every predetermined period. The ECM 110 and the pump control module 144 may lose communication under some circumstances, such as when the LIN 212 becomes disconnected from the ECM 110 and/or the pump control module 144 or when a break occurs in the LIN 212.

The ECM 110 may diagnose a communication fault when the ECM 110 does not receive a signal from the pump control module 144 for at least a predetermined period. The ECM 110 may take one or more remedial actions when the fault is diagnosed. For example, the ECM 110 may store a predetermined diagnostic trouble code (DTC) indicative of the presence of the loss of communication fault between the ECM 110 and the pump control module 144, illuminate a malfunction indicator light (MIL) 216, and/or take one or more other remedial actions. While the example of LIN communication is shown and described, another suitable type of communication/communication medium may be used.

The pump control module 144 also diagnoses a loss of communication with the ECM 110 when the pump control module 144 does not receive a command for the coolant pump 120 via the LIN 212 for at least a predetermined period. The pump control module 144 could disable the coolant pump 120 when a loss of communication with the ECM 110 occurs.

According to the present application, the ECM 110 controls the alternator 136 to increase the voltage of the battery 134 when a loss of communication with the pump control module 144 occurs while the engine 102 is running. Since the alternator 136 charges the battery 134 only when the engine 102 is running (due to the alternator 136 being driven by the engine 102), the pump control module 144 can determine whether the engine 102 is running or not based on the voltage of the battery 134. Instead of disabling the coolant pump 120 when a loss of communication occurs, the pump control module 144 can control the coolant pump 120 and its own operation based on the voltage of the battery 134.

For example, the pump control module 144 can control the coolant pump 120 at a predetermined speed when the voltage of the battery 134 is greater than a predetermined voltage. The voltage of the battery 134 being less than the predetermined voltage indicates that the engine 102 is shut down. In that case, the pump control module 144 can disable the coolant pump 120 and either stay awake (e.g., to possibly receive a command) or operate in a sleep mode (e.g., to reduce power consumption) depending on the voltage of the battery 134.

While the present application will discuss the example of the ECM 110 and the pump control module 144, the present application is also applicable to other modules and actuators of the vehicle. Generally stated, the present application is applicable to systems including a first module and a second module that is external to the first module. The second module is connected to the battery 134 and controls a vehicle actuator based on commands received from the first module via a vehicle network. The first module increases the voltage of the battery 134 when a loss of communication with the second module occurs.

Figure 3:
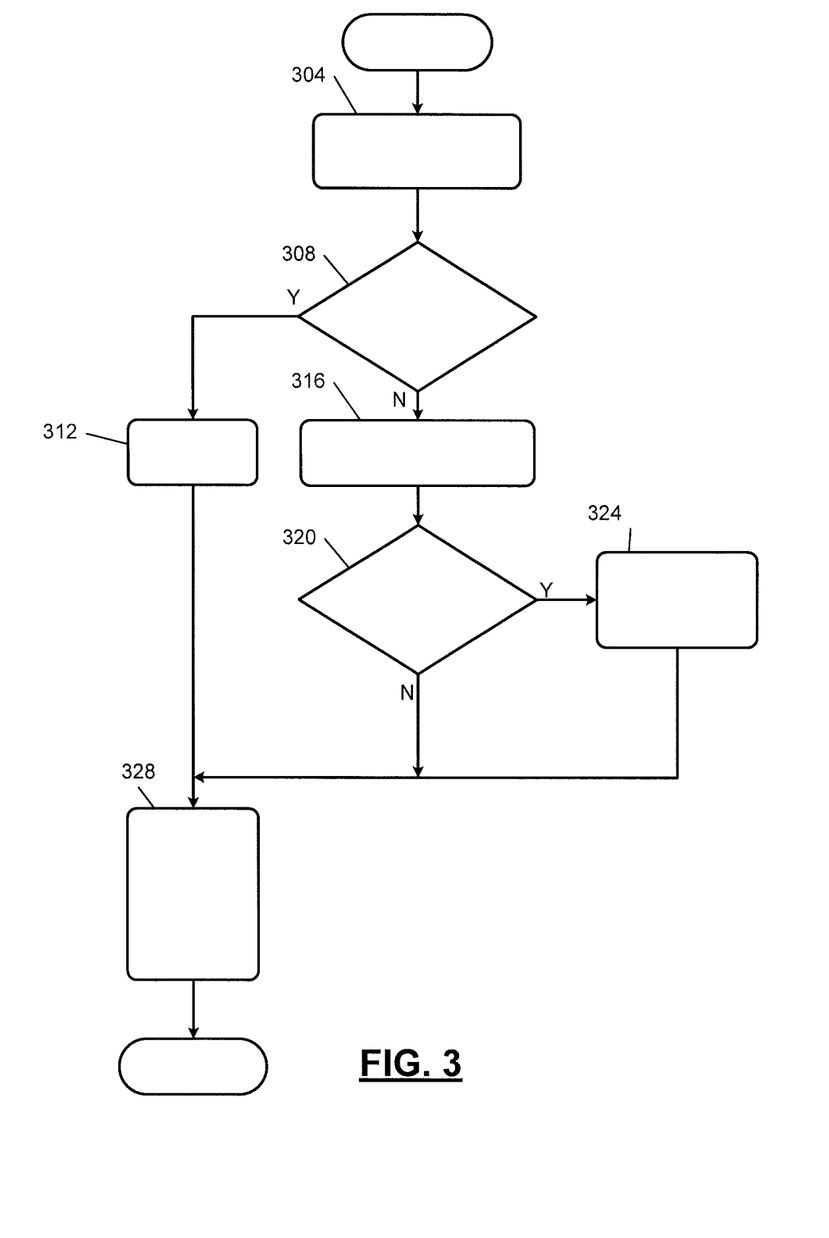
FIG. 3 is a flowchart depicting an example method of controlling an alternator of the vehicle.

FIG. 3 is a flowchart depicting an example method of controlling the alternator 136 that may be performed by the ECM 110 while the engine 102 is running (and the ignition system is ON). Control begins at 304 where the ECM 110 transmits a command to the pump control module 144 via the LIN 212. The command may include, for example, a commanded speed of the coolant pump 120 and other parameters. If received, the pump control module 144 may control the coolant pump 120 based on the command. The ECM 110 also determines a target voltage of the battery 134.

The ECM 110 may determine the target voltage of the battery 134, for example, based on (e.g., present and anticipated) electrical loads of the vehicle, engine torque output, and/or one or more other parameters.

At 308, the ECM 110 determines whether the pump control module 144 has returned a response to the command via the LIN 212 within a predetermined period of the ECM 110 transmitting the command. The predetermined period may be longer or the period between consecutive performances of 304. If 308 is true, the ECM 110 resets a timer at 312, maintains the target voltage of the battery 134, and control continues with 328. 328 is discussed further below. If 308 is false, the ECM 110 increments the timer at 316, and control continues with 320. The timer tracks the period since communication was successful between the ECM 110 and the pump control module 144.

At 320, the ECM 110 determines whether the timer is greater than a predetermined period. If 320 is false, the ECM 110 maintains the target voltage of the battery 134, and control continues with 328. If 320 is true, the ECM 110 increases the target voltage of the battery 134 at 324. For example, the ECM 110 may set the target voltage of the battery 134 to a predetermined maximum voltage of the battery 134 or to another voltage that is greater than a first predetermined voltage used by the pump control module 144, as discussed further below. The resulting increase in the voltage of the battery 134 will indicate to the pump control module 144 that the engine 102 is running. The pump control module 144 can then operate the coolant pump 120 despite the loss of communication. At 324, the ECM 110 may also illuminate the MIL 216, store a predetermined diagnostic trouble code (DTC) in memory associated with the loss of communication, and/or perform one or more other remedial actions. Control then continues with 328.

At 328, the alternator control module 138 controls the alternator 136 based on the target voltage of the battery 134. For example, the alternator control module 138 may control the alternator 136 to increase power output to the battery 134 when the voltage of the battery 134 is less than the target voltage of the battery 134. While control is shown as ending, control may return to 304.

Figure 4:
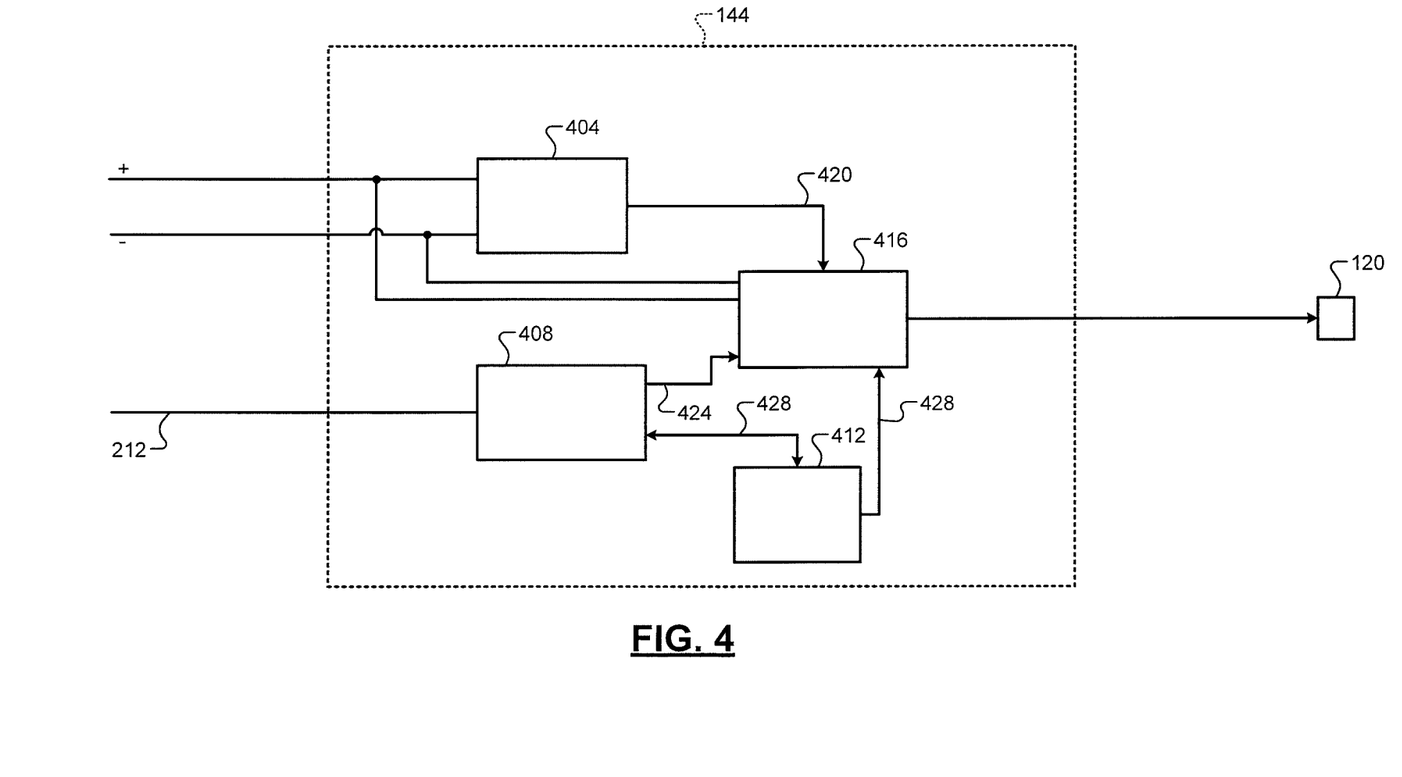
FIG. 4 is a functional block diagram of an example implementation of a pump control module.

FIG. 4 is a functional block diagram of an example implementation of the pump control module 144. The pump control module 144 includes a voltage module 404, a communication module 408, a storage module 412, and a motor control module 416.

The voltage module 404 is directly connected to the positive and negative terminals of the battery 134. The voltage module 404 measures a voltage of the battery 134 at the positive and negative terminals and outputs a (measured) voltage 420 of the battery 134 accordingly. For example, the voltage module 404 may include a resistor and measure the voltage of the battery 134 based on current through the resistor and the resistance of the resistance. The voltage module 404 may measure the voltage and output the voltage 420 at a predetermined rate. The voltage 420 may be a digital value corresponding to the voltage. The voltage module 404 may also convert power from the battery 134 into a regulated voltage and power one or more components of the pump control module 144 with the regulated voltage, such as the communication module 408, the motor control module 416, and the storage module 412.

The communication module 408 monitors the LIN 212. The communication module 408 monitors the LIN 212 and provides, to the motor control module 416, commands 424 transmitted by the ECM 110 to the pump control module 144. The commands 424 may each include, for example, a commanded target speed of the coolant pump 120. The motor control module 416 applies power from the battery 134 to (an electric motor of) the coolant pump 120 to achieve the commanded target speed. For example, based on the commanded target speed, the motor control module 416 may control amplitude and/or frequency of voltage and/or current applied to the coolant pump 120.

Each time that a battery, such as the battery 134, is connected to the vehicle, the ECM 110 sends a first command frame to the pump control module 144 via the LIN 212. The first command frame includes predetermined command data 428 that is utilized by the pump control module 144, as discussed further below. When the first command frame is received, the communication module 408 stores the predetermined command data 428 in the storage module 412.

Figure 5A:
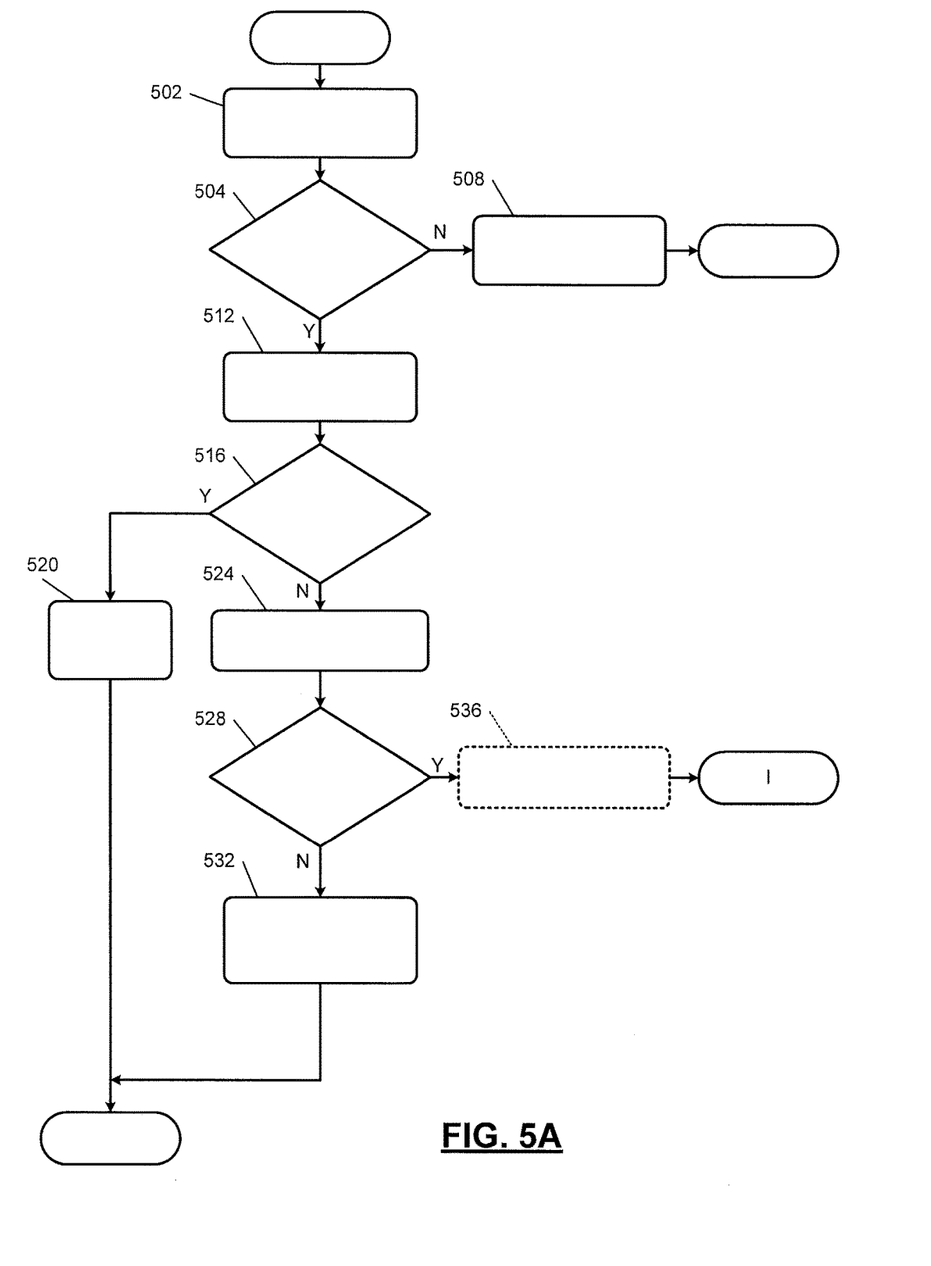
FIGS. 5A-5B include a flowchart depicting an example method of controlling a coolant pump.
Figure 5B:
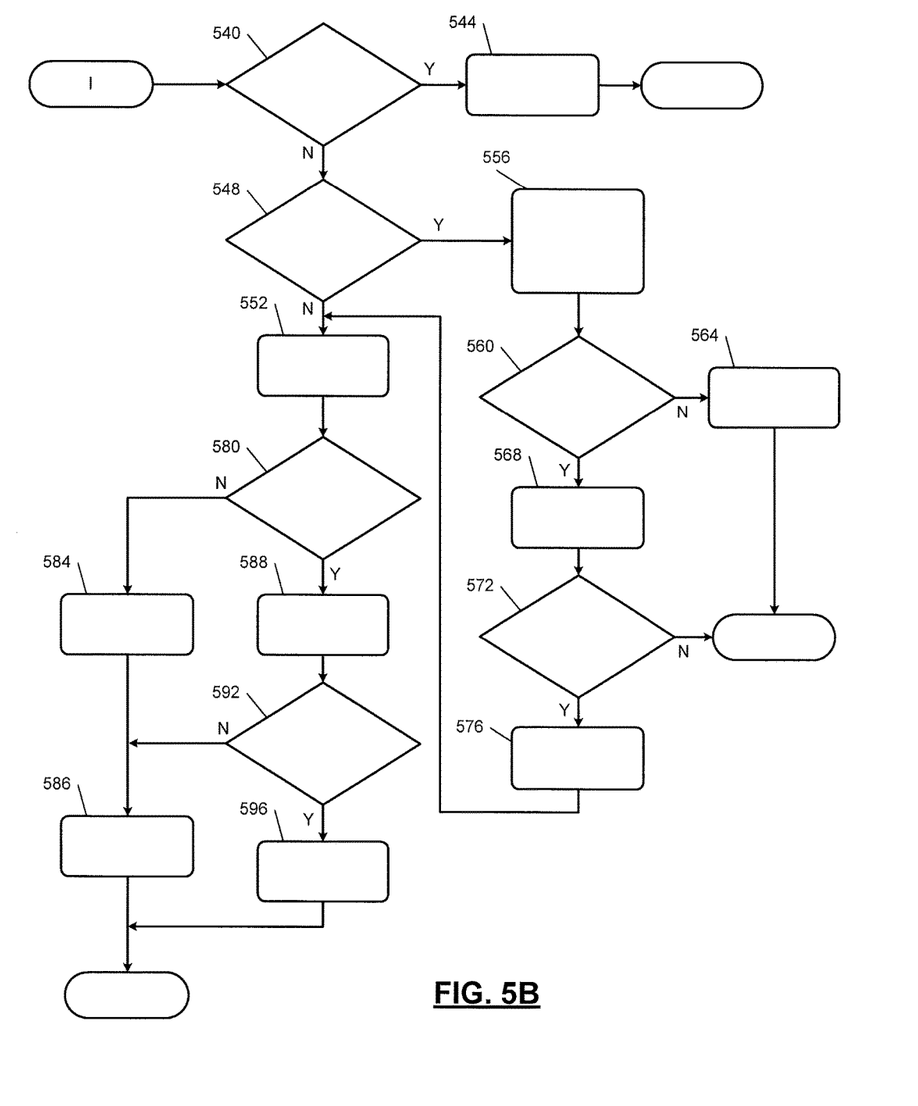

FIGS. 5A and 5B are a flowchart depicting an example method of controlling the coolant pump 120. Control begins with 502 (FIG. 5A) where the voltage module 404 measures and outputs the voltage 420 of the battery 134. The communication module 408 also monitors the LIN 212 at 502.

At 504, the communication module 408 determines whether a first command frame has been received from the ECM 110 via the LIN 212. As discussed above, the first command frame is transmitted by the ECM 110 via the LIN 212 to the pump control module 144 when the battery 134 is connected. If 504 is false, the pump control module 144 may utilize predetermined command data initially stored in the storage module 412 at 508, and control may end. The predetermined command data that is initially stored may indicate, for example, a commanded target pump speed of zero and that the pump control module 144 should operate in a sleep mode. Based on the commanded target pump speed of zero, the motor control module 416 applies zero power to the coolant pump 120, thereby disabling the coolant pump 120. The pump control module 144 operating in the sleep mode minimizes power consumption of the pump control module 144. If 504 is true, control continues with 512.

At 512, the communication module 408 stores the predetermined command data included in the first command frame in the storage module 412. In other words, the communication module 408 updates the initially stored predetermined command data with the predetermined command data received in the first command frame. The predetermined command data includes, for example, a predetermined target speed, a default run request, the first predetermined voltage, a second predetermined voltage, a third predetermined voltage, a first predetermined period, a second predetermined period, a third predetermined period, and/or other data. The predetermined target speed, the default run request, the first predetermined voltage, the second predetermined voltage, the third predetermined voltage, the first predetermined period, the second predetermined period, the third predetermined period are discussed further below. These parameters are used when, and to determine whether, communication between the ECM 110 and the pump control module 144 is lost. While the example of use of first, second, and third predetermined voltages will be discussed, first, second, and third (measured) pump speeds or another suitable measured actuator parameter that varies with battery voltage may be used.

At 516, the communication module 408 determines whether a commanded target speed for the coolant pump 120 has been received from the ECM 110 via the LIN 212. If 516 is true, the communication module 408 resets a first timer value and transmits the commanded target speed 424 for the coolant pump 120 to the motor control module 416 at 520. The motor control module 416 applies power to (the electric motor of) the coolant pump 120 at 520 based on the commanded target speed 424. If 516 is false, control continues with 524.

At 524, the communication module 408 increments the first timer value. At 528, the motor control module 416 determines whether the first timer value is greater than the first predetermined period. If 524 is false, at 532, the motor control module 416 may apply power to (the electric motor of) the coolant pump 120, for example, based on the last received commanded target speed 424 or the predetermined target speed of the coolant pump stored in the storage module 412. If 524 is true, the ECM 110 has or will increase the target voltage of the battery 134, as indicated by 536, and control continues with 540 (FIG. 5B). The first predetermined period may be greater than or equal to the predetermined period (e.g., 320 of FIG. 3) used by the ECM 110 as a condition for increasing the target voltage of the battery 134. For example only, the first predetermined period may be approximately 4 seconds or another suitable period.

The motor control module 416 determines whether the pump default request is the sleep mode at 540 (FIG. 5B). The pump default request may be either the sleep mode or an awake mode and is one piece of the predetermined command data stored in the storage module 412. If 540 is true (i.e., the pump default request is set to the sleep mode), at 544 the motor control module 416 disables application of power to the coolant pump 120, thereby disabling pumping of the coolant pump 120, and the pump control module 144 enters the sleep mode to minimize power consumption. The pump control module 144 may re-enter the awake mode, for example, in response to the receipt of a command to enter the awake mode via the LIN 212. If 540 is false (i.e., the pump default request is set to the awake mode), control continues with 548.

At 548, the motor control module 416 determines whether the (measured) voltage 420 of the battery 134 is greater than the first predetermined voltage. The first predetermined voltage is one piece of the predetermined command data stored in the storage module 412. The first predetermined voltage is less the target voltage of the battery 134 after the increase performed by the ECM (e.g., 324 of FIG. 3). The first predetermined voltage indicates that the engine 102 is running. Thus, the coolant pump 120 should be operated. For example only, the first predetermined voltage may be calibratable and may be approximately 13.0 V (Volts) or another suitable voltage. If 548 is false, at 552 the motor control module 416 disables application of power to the coolant pump 120, thereby disabling pumping of the coolant pump 120, and control continues with 580. 580 is discussed further below. If 548 is true, control transfers to 556. In various implementations, if 548 is false, before 552, the motor control module 416 may determine whether a signal or indicator is set to a first state and continue with 556 if so. If not (the signal or indicator is set to a second state), control may continue with 552.

At 556, the motor control module 416 controls application of power from the battery 134 to the coolant pump 120 based on the pump default speed. The pump default speed is one piece of the predetermined command data stored in the storage module 412. For example, only, the pump default speed may calibratable and may be set to approximately 2500 revolutions per minute (RPM) or another suitable speed. The motor control module 416 also sets the signal or indicator to the first state at 556.

The motor control module 416 determines whether the (measured) voltage 420 of the battery 134 is less than (or equal to) the second predetermined voltage at 560. The second predetermined voltage is one piece of the predetermined command data stored in the storage module 412 and is less than the first predetermined voltage. The voltage 420 being less than the second predetermined voltage may indicate that the second predetermined voltage may indicate that the engine 102 is no longer running and that power consumption of vehicle components has reduced the voltage of the battery 134. For example only, the second predetermined voltage may be calibratable and may be approximately 12.5 V or another suitable voltage that is less than the first predetermined voltage. If 560 is false, at 564 the motor control module 416 resets a second timer value at 564. If 560 is true, the motor control module 416 increments the second timer value at 568, and control continues with 572.

At 572, the motor control module 416 determines whether the second timer value is greater than the second predetermined period. The second predetermined period is one piece of the predetermined command data stored in the storage module 412. For example only, the second predetermined period may be calibratable and may be set to approximately 120 seconds (2 minutes) or another suitable period. If 572 is false, control ends. If 572 is true, the motor control module 416 sets the signal or indicator to the second state at 576, and control continues with 552, which is discussed above. Alternatively, control may end, and the path of 552 will be followed after 548 during a next control loop.

Referring again to 580, the motor control module 416 determines whether the voltage 420 of the battery 134 is less than (or equal to) the third predetermined voltage at 580. The third predetermined voltage is one piece of the predetermined command data stored in the storage module 412. The third predetermined voltage is less than the second predetermined voltage. The third predetermined voltage may be set based on a minimum voltage for performing engine cranking and starting the engine 102 at a next engine startup. For example only, the third predetermined voltage may be calibratable and may be approximately 8.0 V or another suitable voltage that is less than the second predetermined voltage. If 580 is false, at 564 the motor control module 416 resets a third timer value at 584, and the pump control module 144 remains in the awake mode at 586. If 580 is true, the motor control module 416 increments the third timer value at 588, and control continues with 592.

At 592, the motor control module 416 determines whether the third timer value is greater than the third predetermined period. The third predetermined period is one piece of the predetermined command data stored in the storage module 412. For example only, the third predetermined period may be calibratable and may be set to approximately 60 seconds (1 minute) or another suitable period. If 592 is false, the pump control module 144 remains in the awake mode at 586. If 592 is true, the pump control module 144 enters the sleep mode to minimize power consumption at 596. While control is shown as ending after 596, 586, 572, 564, 544, 532, 520, and 508, the example of FIGS. 5A and 5B is illustrative of one control loop and control may return to 502.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A control system of a vehicle, comprising:
   a network;
   a first control module that measures a voltage of a battery of the vehicle and that supplies power from the battery to an actuator of the vehicle based on commands received via the network; and
   a second control module that is external to the first control module, that transmits the commands to the first control module via the network, and that, in response to diagnosing a loss of communication with the first control module, controls an alternator of the vehicle to increase the voltage of the battery, wherein, in response to diagnosing a loss of communication with the second control module, the first control module supplies power to the actuator based on predetermined data stored in the first control module.

2. The control system of claim 1 wherein the first control module diagnoses the loss of communication with the second control module in response to a lack of receipt of any commands from the second control module via the network for longer than a predetermined period.

3. The control system of claim 1 wherein the second control module diagnoses the loss of communication with the first control module in response to a lack of receipt of any communication from the second control module via the network for longer than a predetermined period.

4. The control system of claim 1 wherein the first control module further controls operation of the first control module in one of a low power sleep mode and an awake mode in response to the diagnosis of the loss of communication with the second control module.

5. The control system of claim 1 wherein in response to both (i) the diagnosis of the loss of communication with the second control module and (ii) the voltage of the battery being greater than a predetermined voltage, the first control module supplies power to the actuator based on a target value previously communicated to the first control module by the second control module via the network.

6. The control system of claim 5 wherein, in response to the diagnosis of the loss of communication with the first control module, the second control module controls the alternator of the vehicle to increase the voltage of the battery to greater than the predetermined voltage.

7. The control system of claim 5 wherein the first control module supplies power to the actuator based on the target value until the voltage of the battery is less than a second predetermined voltage, and wherein the second predetermined voltage is less than the predetermined voltage.

8. The control system of claim 7 wherein the first control module disconnects the actuator from the battery when the voltage of the battery is less than a second predetermined voltage.

9. The control system of claim 8 wherein the first control module transitions to operation in a low power sleep mode when the voltage of the battery is less than a second predetermined voltage.

10. The control system of claim 8 wherein the first control module operates in an awake mode until the voltage of the battery is less than a third predetermined voltage and transitions to operation in a low power sleep mode when the voltage of the battery is less than the third predetermined voltage, wherein the third predetermined voltage is less than the second predetermined voltage.

11. A control method for a vehicle, comprising:

by a first control module, measuring a voltage of a battery of the vehicle;

by the first control module, supplying power from the battery to an actuator of the vehicle based on commands received via a network;

by a second control module that is external to the first control module, transmitting the commands to the first control module via the network;

by the second control module, in response to diagnosing a loss of communication with the first control module, controlling an alternator of the vehicle to increase the voltage of the battery; and by the first control module, in response to diagnosing a loss of communication with the second control module, supplying power to the actuator based on predetermined data stored in the first control module.

12. The control method of claim 11 further comprising, by the first control module, diagnosing the loss of communication with the second control module in response to a lack of receipt of any commands from the second control module via the network for longer than a predetermined period.

13. The control method of claim 11 further comprising, by the second control module, diagnosing the loss of communication with the first control module in response to a lack of receipt of any communication from the second control module via the network for longer than a predetermined period.

14. The control method of claim 11 further comprising, by the first control module, operating in one of a low power sleep mode and an awake mode in response to the diagnosis of the loss of communication with the second control module.

15. The control method of claim 11 further comprising, by the first control module, in response to both (i) the diagnosis of the loss of communication with the second control module and (ii) the voltage of the battery being greater than a predetermined voltage, supplying power to the actuator based on a target value previously communicated to the first control module by the second control module via the network.

16. The control method of claim 15 further comprising, by the second control module, in response to the diagnosis of the loss of communication with the first control module, controlling the alternator of the vehicle to increase the voltage of the battery to greater than the predetermined voltage.

17. The control method of claim 15 further comprising, by the first control module, supplying power to the actuator based on the target value until the voltage of the battery is less than a second predetermined voltage, wherein the second predetermined voltage is less than the predetermined voltage.

18. The control method of claim 17 further comprising, by the first control module, disconnecting the actuator from the battery when the voltage of the battery is less than a second predetermined voltage.

19. The control method of claim 18 further comprising, by the first control module, transitioning to operation in a low power sleep mode when the voltage of the battery is less than a second predetermined voltage.

20. The control method of claim 18 further comprising, by the first control module:

operating in an awake mode until the voltage of the battery is less than a third predetermined voltage; and operating in a low power sleep mode when the voltage of the battery is less than the third predetermined voltage, wherein the third predetermined voltage is less than the second predetermined voltage.

* * * * *